(12) United States Patent
Graves et al.

(10) Patent No.: US 10,389,442 B2
(45) Date of Patent: Aug. 20, 2019

(54) FREE SPACE OPTICAL (FSO) SYSTEM

(71) Applicant: SA Photonics, Inc., Los Gatos, CA (US)

(72) Inventors: J. Elon Graves, Los Gatos, CA (US); William Dickson, Granville, OH (US); Greg Mitchell, Elk Grove, CA (US); Andy McClaren, Santa Cruz, CA (US); Dave Pechner, San Jose, CA (US)

(73) Assignee: SA Photonics, Inc., Los Gatos, CA (US)

( * ) Notice: Subject to any disclaimer, the term of this patent is extended or adjusted under 35 U.S.C. 154(b) by 0 days.

(21) Appl. No.: 15/815,562

(22) Filed: Nov. 16, 2017

(65) Prior Publication Data

US 2018/0083700 A1   Mar. 22, 2018

Related U.S. Application Data

(63) Continuation of application No. 15/243,800, filed on Aug. 22, 2016.

(60) Provisional application No. 62/208,561, filed on Aug. 21, 2015.

(51) Int. Cl.
| | | |
|---|---|---|
| H04B 10/11 | (2013.01) | |
| H04B 10/40 | (2013.01) | |
| H04B 10/112 | (2013.01) | |
| G02B 6/32 | (2006.01) | |
| H04J 14/02 | (2006.01) | |
| H04B 10/00 | (2013.01) | |

(52) U.S. Cl.
CPC ........... *H04B 10/11* (2013.01); *H04B 10/112* (2013.01); *H04B 10/1125* (2013.01); *H04B 10/40* (2013.01); *G02B 6/32* (2013.01); *H04B 10/142* (2013.01); *H04J 14/02* (2013.01)

(58) Field of Classification Search
CPC .... H04B 10/11; H04B 10/1125; H04B 10/40; H04B 10/112; H04B 10/10; H04B 10/1123; H04B 10/105; H04B 10/116; H04B 10/1127; G01N 21/01; G06K 9/00; H04Q 11/00; G01B 11/02; G02B 6/26; G02B 6/32
USPC ................................ 398/128, 140, 118, 129
See application file for complete search history.

(56) References Cited

U.S. PATENT DOCUMENTS

| | | |
|---|---|---|
| 3,840,794 A | 10/1974 | Clement et al. |
| 4,518,854 A | 5/1985 | Hutchin |
| 4,635,299 A | 1/1987 | MacGovern |
| 5,465,170 A | 11/1995 | Arimoto |

(Continued)

FOREIGN PATENT DOCUMENTS

EP    1806858    7/2007

OTHER PUBLICATIONS

PCT International Search Report and Written Opinion, PCT Application No. PCT/US16/48086, dated Nov. 4, 2016, 7 pages.

(Continued)

*Primary Examiner* — Abbas H Alagheband
(74) *Attorney, Agent, or Firm* — Fenwick & West LLP

(57) ABSTRACT

A detector configuration for use in a free space optical (FSO) node for transmitting and/or receiving optical signals has a plurality of sensors for detecting received optical signals. The plurality of sensors is configured along a common optical path and are used for separate functions. According, the detectors may be optimized for the respective function.

19 Claims, 10 Drawing Sheets

(56) References Cited

U.S. PATENT DOCUMENTS

| | | | |
|---|---|---|---|
| 5,477,550 A | 12/1995 | Crisler et al. | |
| 5,483,060 A * | 1/1996 | Sugiura | G01J 1/04 |
| | | | 250/203.4 |
| 5,701,132 A | 12/1997 | Kollin et al. | |
| 6,097,522 A | 8/2000 | Maerki et al. | |
| 6,141,128 A | 10/2000 | Korevaar et al. | |
| 6,469,815 B1 | 10/2002 | Poon et al. | |
| 6,535,314 B1 * | 3/2003 | Mendenhall | H04B 10/118 |
| | | | 250/491.1 |
| 6,674,974 B1 * | 1/2004 | Stieger | H04B 10/1121 |
| | | | 250/214 A |
| 6,683,850 B1 | 1/2004 | Dunning et al. | |
| 6,721,510 B2 * | 4/2004 | Graves | H04B 10/1125 |
| | | | 398/122 |
| 6,804,422 B1 * | 10/2004 | Bajorins | G02B 6/32 |
| | | | 359/407 |
| 6,865,034 B1 | 3/2005 | Willis | |
| 7,072,543 B2 * | 7/2006 | Pierce | G02B 6/14 |
| | | | 385/28 |
| 7,277,644 B2 | 10/2007 | Johnson et al. | |
| 7,406,263 B2 * | 7/2008 | Graves | H04B 10/60 |
| | | | 250/201.9 |
| 7,437,077 B2 * | 10/2008 | Wirth | G02B 26/06 |
| | | | 250/201.9 |
| 7,505,695 B2 | 3/2009 | Sugihara et al. | |
| 7,551,121 B1 * | 6/2009 | O'Connell | F41G 5/08 |
| | | | 235/400 |
| 7,593,641 B2 * | 9/2009 | Tegge, Jr. | H04B 10/118 |
| | | | 398/118 |
| 7,711,441 B2 * | 5/2010 | Tillotson | B60L 8/00 |
| | | | 700/59 |
| 7,809,278 B2 * | 10/2010 | Morris | H04B 10/116 |
| | | | 398/129 |
| 7,835,387 B2 | 11/2010 | Agazzi et al. | |
| 8,260,146 B2 * | 9/2012 | Graves | H04B 10/1123 |
| | | | 398/118 |
| 8,334,982 B2 * | 12/2012 | Fang-Yen | A61B 5/1455 |
| | | | 356/497 |
| 8,525,091 B2 * | 9/2013 | Cui | G01J 9/02 |
| | | | 250/201.9 |
| 8,539,297 B1 | 9/2013 | Goyal et al. | |
| 8,660,312 B2 * | 2/2014 | Cui | G01B 11/2441 |
| | | | 382/106 |
| 8,942,562 B2 * | 1/2015 | Pusarla | H04B 10/112 |
| | | | 398/115 |
| 9,528,817 B2 * | 12/2016 | Fang-Yen | A61B 5/1455 |
| 9,810,862 B2 * | 11/2017 | Graves | G02B 6/4206 |
| 2001/0006210 A1 | 7/2001 | Yanagi et al. | |
| 2002/0109884 A1 * | 8/2002 | Presley | H04B 10/1125 |
| | | | 398/121 |
| 2002/0131121 A1 * | 9/2002 | Jeganathan | H04B 10/1127 |
| | | | 398/128 |
| 2002/0181055 A1 | 12/2002 | Christiansen et al. | |
| 2004/0071398 A1 | 4/2004 | Pierce et al. | |
| 2004/0086282 A1 * | 5/2004 | Graves | H04B 10/60 |
| | | | 398/202 |
| 2004/0233420 A1 | 11/2004 | Deflumere et al. | |
| 2005/0100339 A1 * | 5/2005 | Tegge, Jr. | H04B 10/118 |
| | | | 398/125 |
| 2007/0035855 A1 * | 2/2007 | Dickensheets | A61B 5/0068 |
| | | | 359/819 |
| 2007/0217795 A1 | 9/2007 | Otte | |
| 2007/0290096 A1 | 12/2007 | Jenkins et al. | |
| 2009/0213953 A1 | 8/2009 | Yang | |
| 2011/0041041 A1 | 2/2011 | Kim | |
| 2011/0149298 A1 | 6/2011 | Arieli et al. | |
| 2012/0141144 A1 | 6/2012 | Cai et al. | |
| 2012/0248347 A1 * | 10/2012 | Renna | G02B 21/0032 |
| | | | 250/573 |
| 2013/0100792 A1 | 4/2013 | Nakamura | |
| 2013/0107850 A1 | 5/2013 | Agiwal et al. | |
| 2013/0156439 A1 | 6/2013 | Arnold et al. | |
| 2014/0068357 A1 | 3/2014 | Georges et al. | |
| 2015/0188628 A1 * | 7/2015 | Chalfant, III | G02B 13/22 |
| | | | 398/131 |
| 2015/0215040 A1 * | 7/2015 | Dickson | H04B 10/1125 |
| | | | 398/131 |
| 2015/0215041 A1 | 7/2015 | Pechner | |

OTHER PUBLICATIONS

PCT International Search Report and Written Opinion, PCT Application No. PCT/US16/48091, dated Nov. 15, 2016, 9 pages.

U.S. Appl. No. 62/238,637, filed Oct. 7, 2015, [Copy Not Enclosed].

U.S. Appl. No. 62/266,710, filed Dec. 14, 2015, [Copy Not Enclosed].

Sackinger, Eduard, Broadband Circuit for Optical Fiber Communication, 2002, Agere System, pp. 37-77.

Kiasaleh, Kamran, Hybrid ARO Receiver for Packet Communications over Free-Space Optical Channels, 2006, SPIE, pp. 1-12.

Yang et al., A Hybrid Automatic Repeat Request (HARO) with Turbo Codes in OFDM System, 2010, IEEE, pp. 1-4.

PCT International Search Report and Written Opinion, PCT Application No. PCT/US2015/013368, dated May 7, 2015, 12 pages.

U.S. Appl. No. 62/238,634, filed Oct. 7, 2015, [Copy Not Enclosed].

United States Office Action, U.S. Appl. No. 15/243,800, dated Aug. 24, 2017, 15 pages.

* cited by examiner

FREE SPACE OPTICAL (FSO) SYSTEM

CROSS REFERENCE TO RELATED APPLICATIONS

This application is a continuation of prior, co-pending U.S. application Ser. No. 15/243,800, filed on Aug. 22, 2016, which claims priority to U.S. application Ser. No. 62/208,561, filed Aug. 21, 2015, both of which are incorporated by reference in its entirety into this application.

STATEMENT REGARDING FEDERALLY SPONSORED RESEARCH OR DEVELOPMENT

This invention was made with government support under SBIR-N68335-14-C-0273 awarded by the Department of Defense. The government has certain rights in the invention.

BACKGROUND

In a two-node bi-directional Free Space Optical (FSO) communication system, the two FSO nodes exchange data encoded on optical carrier beams sent across an unobstructed line of sight (LOS) between the two nodes. As shown in FIG. 1, a conventional two-node bi-directional system is illustrated. As shown, a first node 2 and a second node 3 communicate by transmitting and receiving a signal 6, 7 sent between the nodes. The data can be encoded on the signals in any matter; a binary, on-off, exemplary signal is illustrated for simplicity. Each node has an optical output 4 for transmitting the desired signal 6, 7, and also an optical input 5 for receiving the transmitted signal. Once received, the internal electronics of the node can decode the signal and obtain the transmitted data.

The communication system only works if the transmit path of the first node is aligned with the receiving components of the second node. In order to optimize tracking, conventional systems have split the received beam into two paths: one for detection and one for alignment. As shown in FIG. 1, the exemplary system uses a beam splitter and separate detectors as an alignment sensor and as a detector (processing) sensor. The resulting system is complex as it requires beam splitting and multiple paths to perform each function (e.g. alignment and detecting). Errors are also introduced into the system through the misalignment and/or drift between the multiple paths.

SUMMARY

A free space optical terminal is disclosed including a wave front sensor comprising a free space in an interior region of the wave front sensor; and a receiver within the free space of the wave front sensor. The resulting free space optical (FSO) terminal therefore may have a wave front sensor used for aligning the system and a detector used to receive a data transmission received on an optical beam. In an exemplary embodiment, the wave front sensor and the detector are different optical components, and the terminal may be configured such that a first portion of the received light is received at the wave front sensor and a second portion of the received light source is received at the detector, where a beam splitter is not used to separate the first portion from the second portion. Therefore, the first portion of light and the second portion of light may follow the same optical beam path along an entire length or along a portion of a length at the sensors within the system. In an exemplary embodiment, the first portion circumscribes the second portion.

DRAWINGS

DESCRIPTION

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

Exemplary embodiments may be used to greatly simplify the complexity of a free space optical (FSO) terminal, while maintaining the benefit achieved by separate alignment and detection sensors. Accordingly, exemplary FSO terminals according to embodiments described herein include separate detection sensor(s) and alignment sensor(s) configured or positioned such that the received optical path is maintained as a single received optical path. Accordingly, exemplary embodiments may reduce misalignment into the system by not subdividing the paths to the separate detectors. An exemplary FSO terminal may be capable of unidirectional or bi-directional high bandwidth optical communications.

Although embodiments of the invention may be described and illustrated herein in terms of an alignment sensor and detection sensor, it should be understood that embodiments of this invention are not so limited, but are additionally applicable to functional components of the system. For example, the respective sensors may be used for other purposes. Accordingly, exemplary embodiments may be used when it is desired to have two system components using portions of the same free space signal and it is desired to keep the components along the same signal path and not split the signal into separate paths. Accordingly, the detector and alignment sensors described herein may be used for any system function. Moreover, exemplary embodiments may be adapted to other free space systems, not necessarily limited to optical applications or communication systems.

Figure 1:
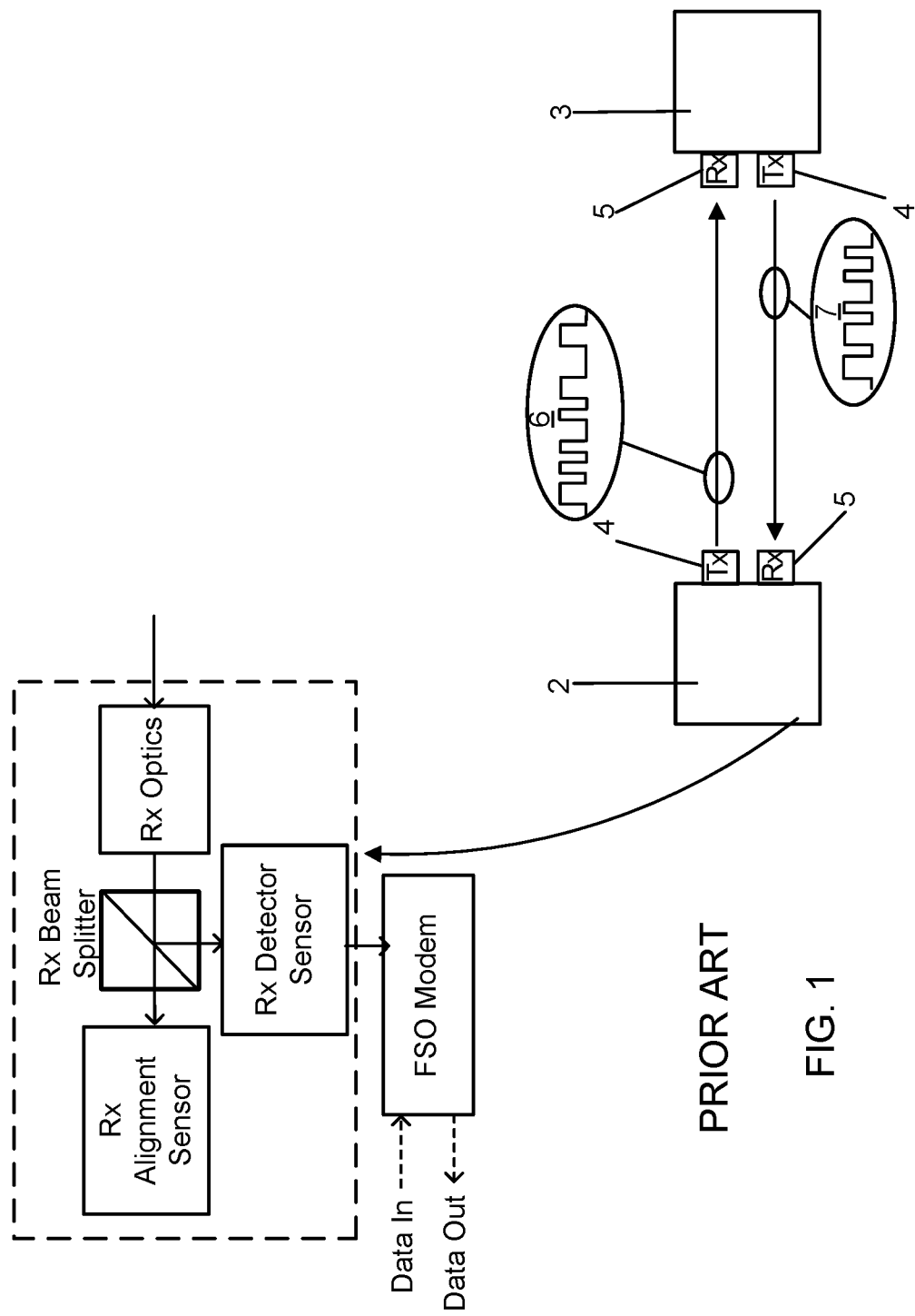
FIG. 1 illustrates and exemplary prior art free space optical system.
Figure 2:
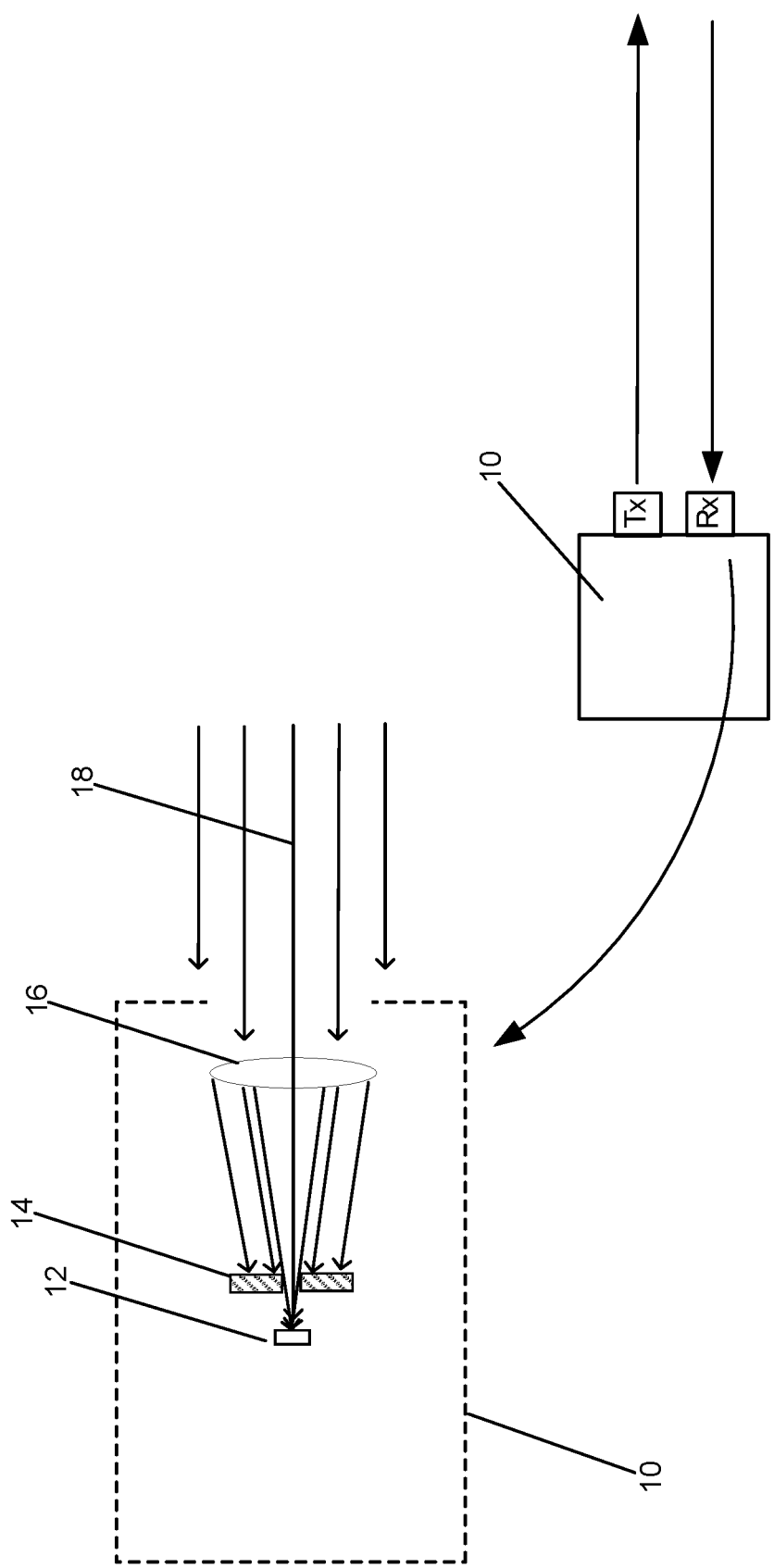
FIG. 2 illustrates an exemplary FSO node according to embodiments described herein.

FIG. 2 illustrates an exemplary FSO node 10 according to embodiments described herein. The exemplary node 10 include transmit and receive optics as in conventional systems, which are not illustrated for purposes of simplicity. However, as shown in the exploded portion illustrating the receive path, the detection sensor 12 is along the same optical path (receiving beam path 18) as the alignment sensor 14. In an exemplary embodiment, the alignment is achieved by incorporating a hole, aperture, or passage in the alignment sensor 14 such that a portion of the received beam falls on the alignment sensor and a portion of the receive beam falls on the detection sensor 12.

As shown, the detection sensor is positioned out of plane from the alignment sensor. However, such configuration is not necessary. In an exemplary embodiment, the system includes a lens 16 or other optics for directing and/or focusing the received light 18 toward the sensor(s). The detection sensor 12 is shown positioned approximately at the focal point of the received path as set by lens 16. The alignment detector is shown positioned in a plane after the lens 16 and before the focal point at the detection sensor 12, relative to the received optical path 18 (or between the focal point and the optics defining the focal point). The detection sensor 12 may be in plane with the alignment sensor 14, out of plane with the alignment sensor 14, or before or after the alignment sensor 14. The purpose of the sensors may also be swapped such that sensor 14 is the detection sensor and detector 12 is the alignment sensor. For example, the alignment sensor is a central sensor, while the detection sensor is the annular sensor. Multiple annular sensors may be incorporated for different purposes to permit two or more detector functions on the same optical path. The component shown as the detection sensor 12 may also be any combination of optical components. For example, the detection sensor may be replaced with other components, such as mirrors, lenses, splitters, optical fibers, etc. that is used to direct the light before the detection sensor. Exemplary configurations of such additional component combinations are described with respect to FIGS. 4-5.

Figure 3:
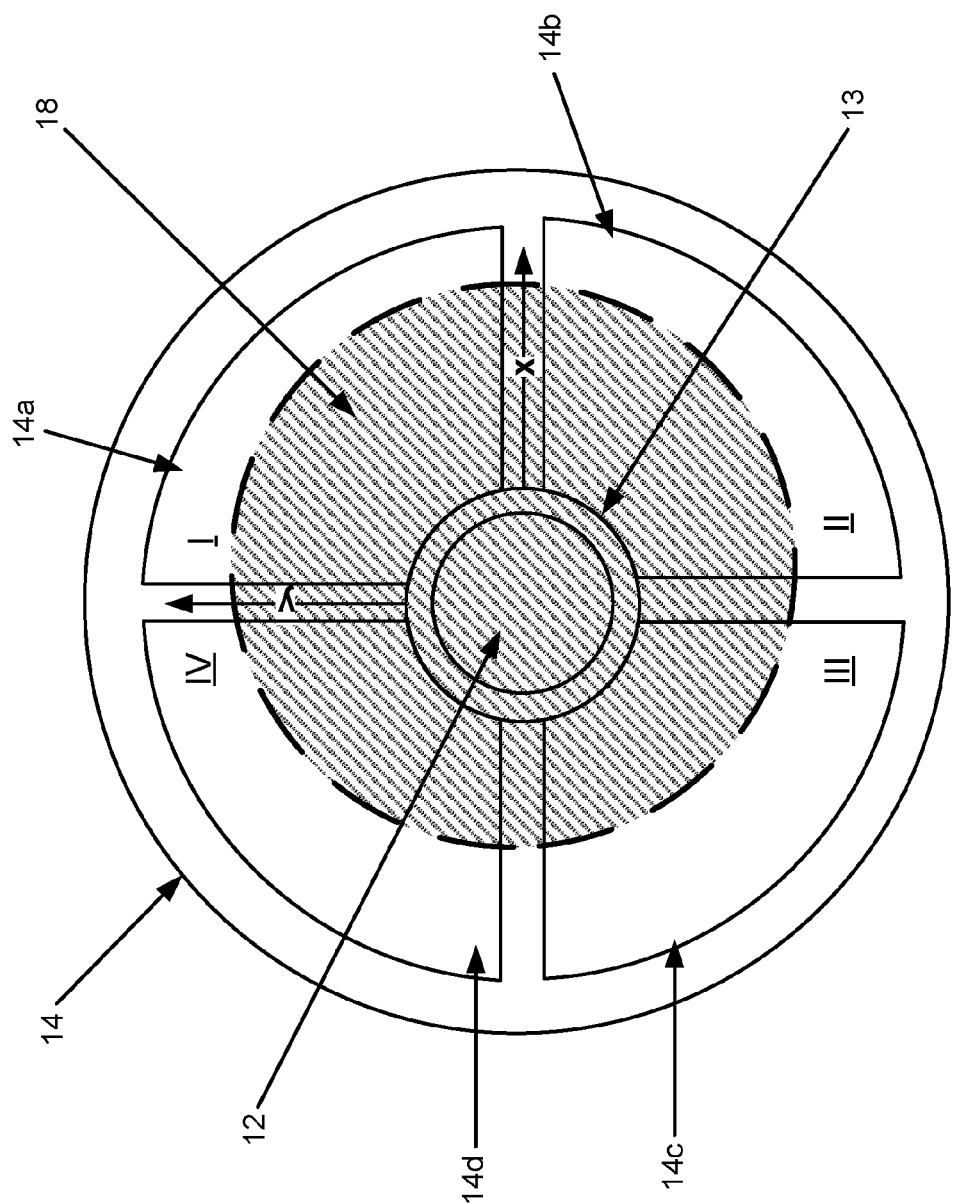
FIG. 3 illustrates and exemplary front elevation view of a detection sensor and alignment sensor described herein.

FIG. 3 illustrates and exemplary front elevation view of the detection sensor 12 and alignment sensor 14 having a common optical receive path as seen elevated from a direction normal the detection surface. As shown, the detection sensor 12 and alignment sensor 14 are concentric. In an exemplary embodiment, at least the outer perimeter of the alignment sensor 14 circumscribes and is positioned radially outside the detection sensor 12 when viewed from a front profile. The alignment sensor 14 may be longitudinally offset from the detection sensor 12 along the optical receive path but still may radially circumscribe the detection sensor when viewed in profile from a perspective of the optical path (front face of the sensor(s)). FIG. 3 illustrates the detection sensor 12 as being radially smaller than an inner diameter of the aperture of the alignment sensor 14. However, such a relationship is not necessary. As shown in FIG. 2, the outer diameter of the detection sensor 12 is greater than the inner diameter of the passage defined by the alignment sensor 14.

FIG. 3 illustrates an incoming beam 18 offset on the alignment sensor 14. As provided in FIG. 6, an exemplary method of aligning a system 60 may use the coaxial alignment and detection sensors. At step 62, the alignment system and detection system are coaxially aligned. The alignment system may be the quad-cell as described herein with respect to FIG. 3 or some other combination of optics/sensors to obtain a segmented detection of the incoming light. The detection system may be the detection sensor as illustrated with respect to FIG. 3. However, the detection system may also include other configurations such as those of FIGS. 4-5 in which the light is further manipulated through other optics, such as splitter(s), len(s), optical fiber(s), mirror(s), and combinations thereof before reaching the detection sensor. The coaxial arrangement permits the same receive optical path to be used with two detection systems, where each detection system is used and can be optimized for its own function (i.e. alignment/detection/other).

At step 64, the alignment sensor can detect the horizontal and vertical displacement of the beam 18 on the detector face. At step 66, the displacements may be determined or calculated based on a comparison of the detected signals from step 64. For example, the ratio of the difference of the light on each half of the detector divided by the whole by be used to determine a percentage offset from the center of the detector in orthogonal (x-y) directions. In this case, the x displacement will be the signal difference from the total of the first and second quadrants minus the total from of the third and fourth quadrants divided by the total signal: $[(14a+14b)-(14c+14d)]/(14a+14b+14c+14d)$. Similarly, the y displacement can be determined by comparing the signal from the upper quadrants to that of the lower quadrants $[(14a+14d)-(14b+14c)]/(14a+14b+14c+14d)$. At step 68, the system may be manually or automatically adjusted to realign the node such that the received beam 18 is centered on the detection sensor 14. After the system is aligned, at step 70, the detection sensor may be used to detect the incoming light, which is decoded by the system.

Figure 4:
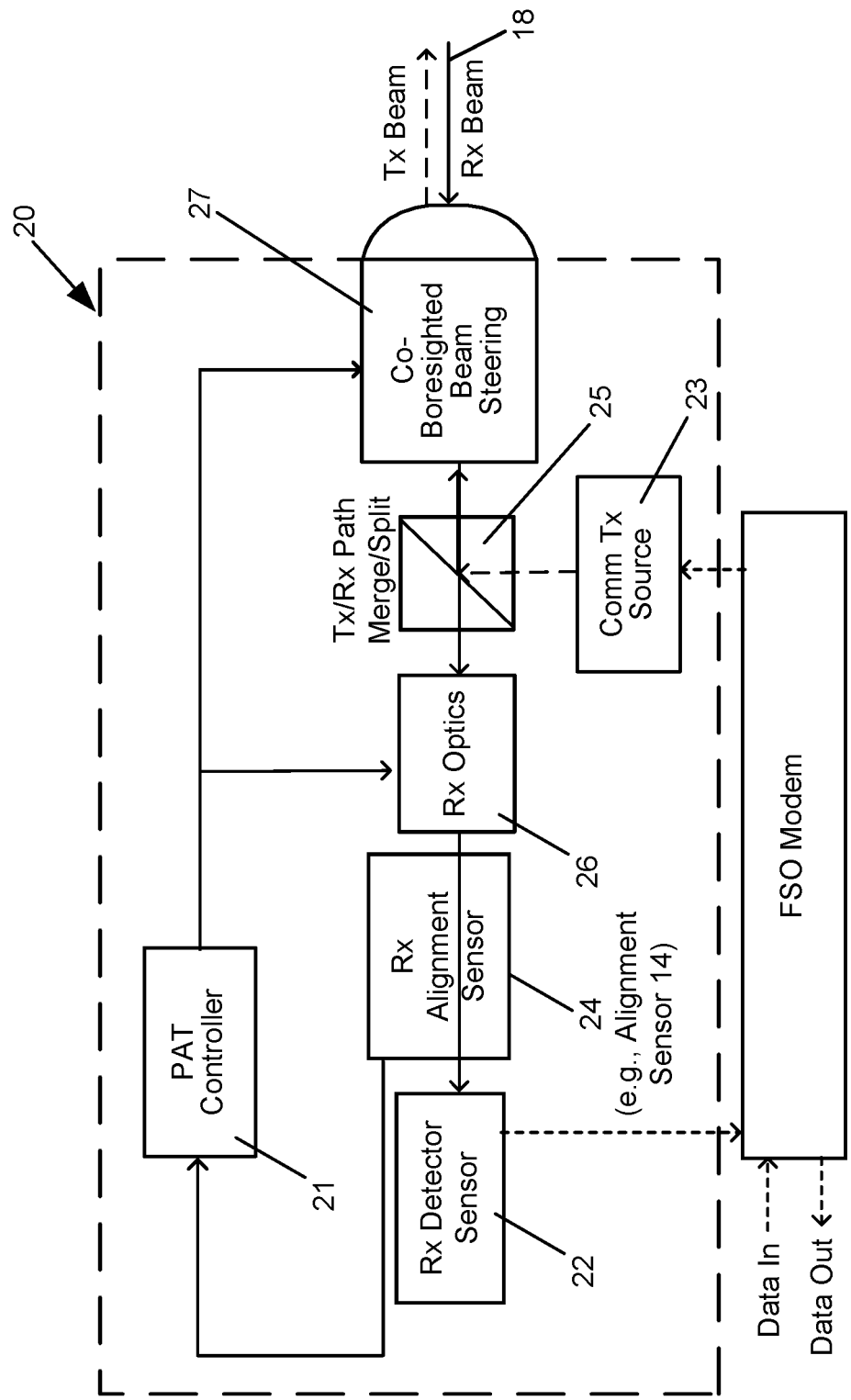
FIGS. 4-6 illustrate exemplary block diagram embodiments of FSO nodes having a common transmit and receive aperture—co-boresighted node according to embodiments described herein.
Figure 5:
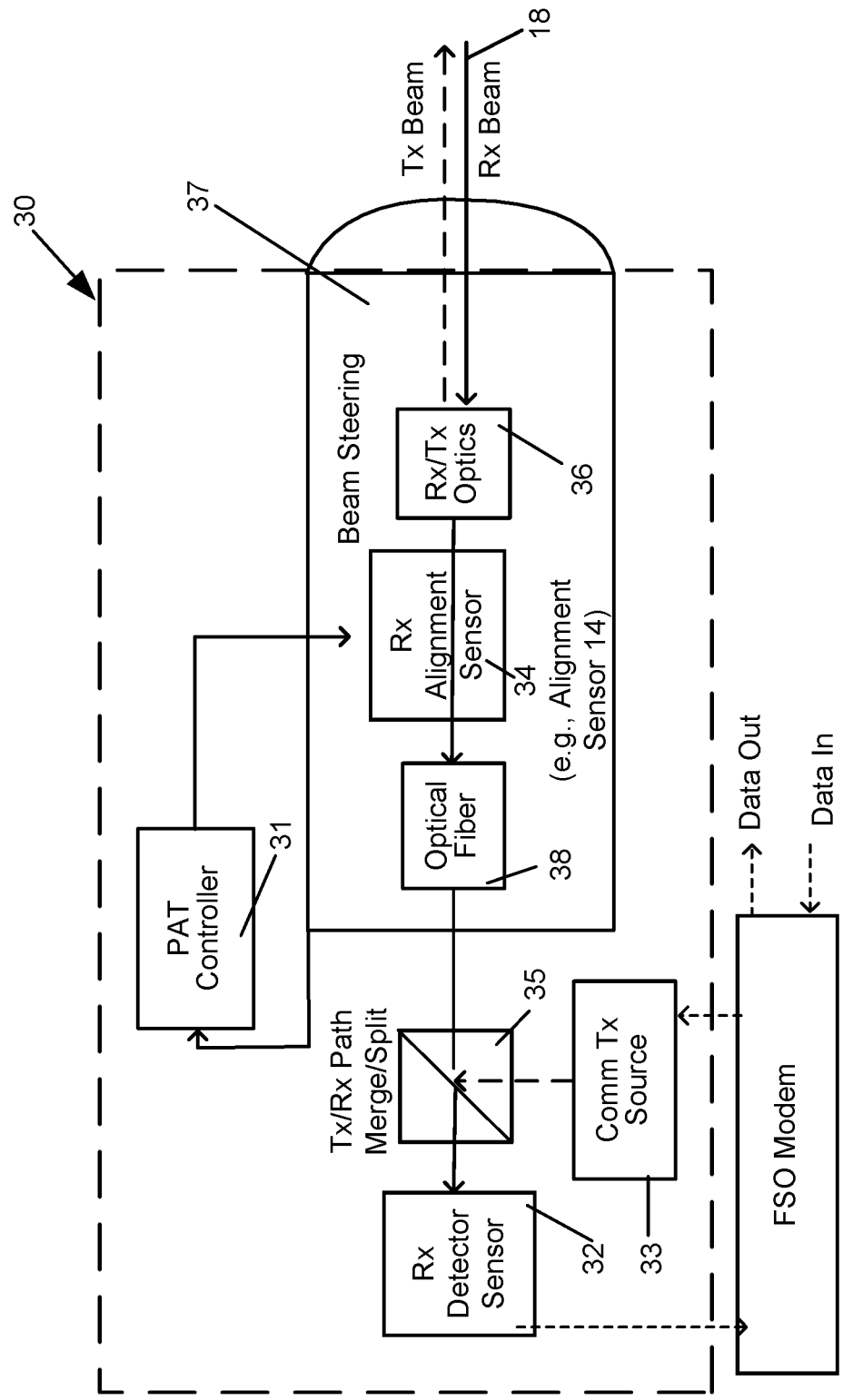

FIGS. 4 and 5 illustrate exemplary embodiments in which the transmit and receive aperture of the node are the same—co-boresighted node. In these cases, the transmit and receive paths are shared for at least a portion of the optical path traveled within the node. Ultimately, the transmit and receive paths will split, and FIGS. 4 and 5 illustrate different configurations of when the split may occur.

Figure 6:
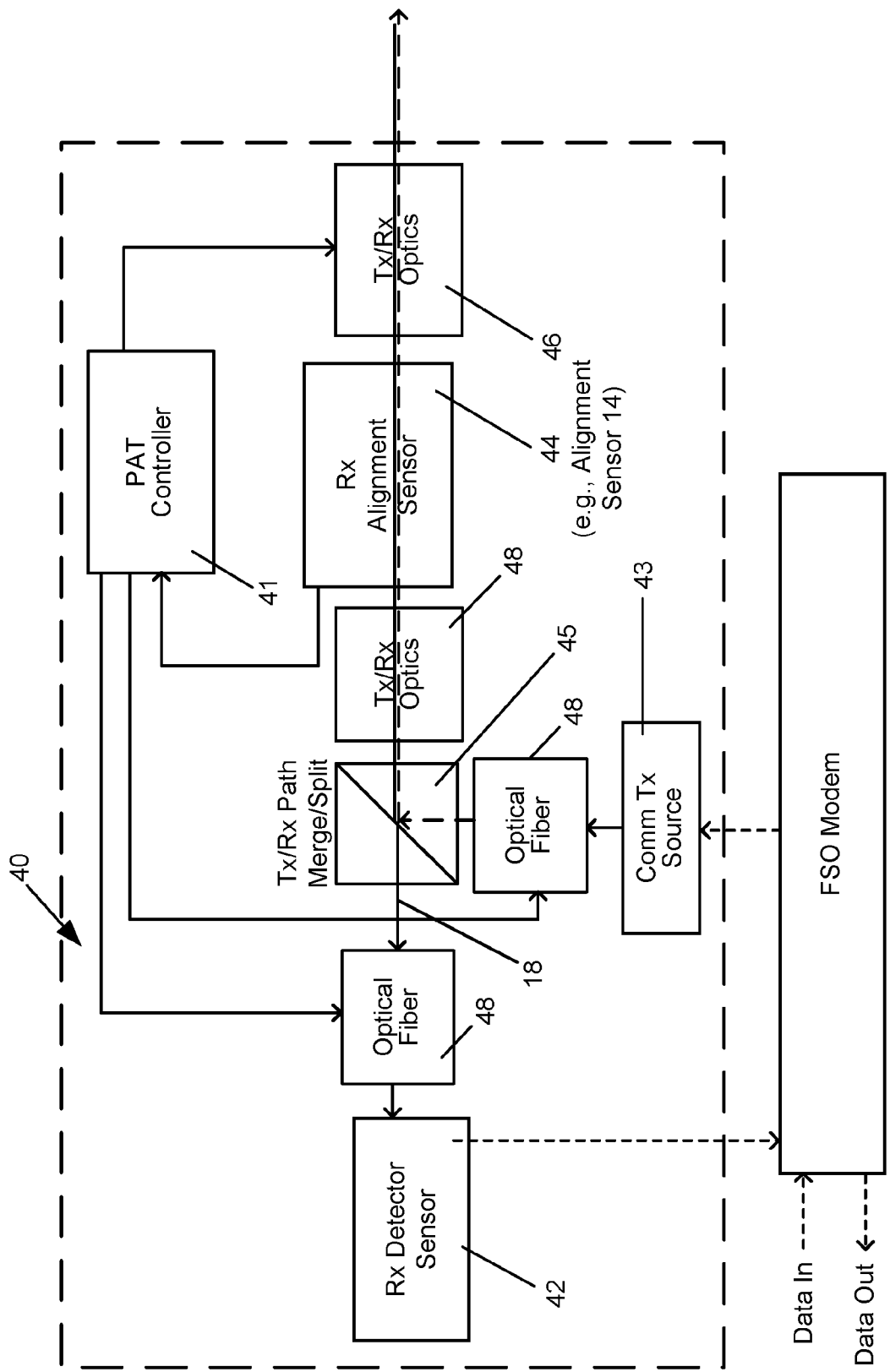

FIGS. 4-6 are system block diagrams to illustrate exemplary features and alternatives within the scope of the present invention. For example, different combinations of optics are uses in different orders to integrate and/or separate the optical path at different points. The system components may be integrated, separated, rearranged, removed, duplicated, or other components added and remain within the scope of the instant disclosure. FIGS. 4-6 illustrate a co-boresighted node in which the transmit and receive optical paths are aligned, co-axial, or concentric for at least a portion of the optical path. As shown, the FSO node comprises a common transmit and receive aperture.

FIG. 4 illustrates an exemplary co-boresighted FSO node having a common transmit and receive optical path. As shown, the node 20 includes a common transmit and receive path for outgoing and incoming optical signals. The system can include a co-boresighted beam steering unit 27 that can align the beams with the internal optics. The common optical paths may then be split into the separate transmit and receive paths at a splitter or separator 25. This component can be any optical component or beam splitter to separate the beam paths, such as a dichromic mirror, circulator, etc. Once separated, the transmit beam path comprises an optical transmitter 23 to generate the optical signal according to the FSO Modem and processor. The received beam path comprises the optics associated with aligning and detecting the signal. The received optics 26 may include any combination of optical components for directing, focusing, or otherwise manipulating the incoming beam for detection, processing, orienting, directing, filtering, or other function. As shown, the received alignment sensor 24 passes at least a portion of the light to the received detection sensor 22 such that these two sensors are along the same beam path. The received alignment sensor 24 is configured as described herein. For example, the received alignment sensor 24 may be any configuration of sensors to receive a portion of the received light from the outer periphery of the light beam, and passes the portion of the light at the center of the beam. As described herein the alignment sensor 24 and detection sensor 22 may be interchanges, may be in the same focal plane, may be longitudinally displaced along the received beam path, or otherwise arranged as described herein. The alignment sensor 24 communications with PAT controller 21 to adjust the optics and beam steering in response to the detected signal as described herein. The detection sensor 22 communications with the FSO modem to analyze and decode the received optical signals once converted to electrical form. The optical path between any system components may be along a free space path, through an optical component such as an optical fiber, or combinations thereof.

FIG. 5 illustrates an exemplary co-boresighted FSO node having a common transmit and receive optical path. In this configuration, a larger portion of the common path is integrated so consolidated control and alignment. As shown, the beam steering platform 37 includes the transmit and receive optics for filtering, directing, focusing, etc. the beam in and out of the FSO node 30. A receive alignment sensor 34 is configured to receive a portion of the received light and pass a portion of the received light. The passed, unobstructed light is then split at a beam splitter 35 between the receive path to the received detector 32 and the transmit source 33, each of which are coupled to the FSO modem for signal processing and control. The PAT controller 31 controls the beam steering unit 37 based on the detected signal from the alignment sensor 34. This configuration may use free optical paths and/or guided optical paths, such as through a light guide or optical fiber. As shown, a terminal end of an optical fiber 38 is positioned at the focal point of the receive optics to direct the light through the system. The light path between box 38 and 35 or other components may be through an optical fiber. As shown, an optical fiber may be positioned at or adjacent the focal point of a focusing lens within the receive/transmit optics 36. The optical fiber may couple to two other optical fibers for directing the light to and from the receive sensor 32 and transmit source 33. The beam splitter 35 or other optical components used herein may include a circulator, splitters, optical fibers, and other components as described in U.S. Pat. Nos. 8,260,146 and 6,721,510, incorporated by reference in their entirety herein.

FIG. 6 illustrates an exemplary arrangement in which the alignment sensor 44 is forward in the system optical path adjacent the node aperture. As shown, transmit and receive optics 46 may be used to focus or otherwise manipulate the light onto the alignment system 44 and through the rest of the system. After passing through the aperture of the alignment sensor, the light may be split at splitter 45 and focused through more optics or otherwise directed through optical fibers 48 to the detection sensor 42 and transmit source 43 respectively. The PAT controller 41 may be used to control any combination of the Tx/Rx optics 46 and/or the optical fibers 48 leading to RX detector 42 and/or transmit optical source 43.

Figure 7A:
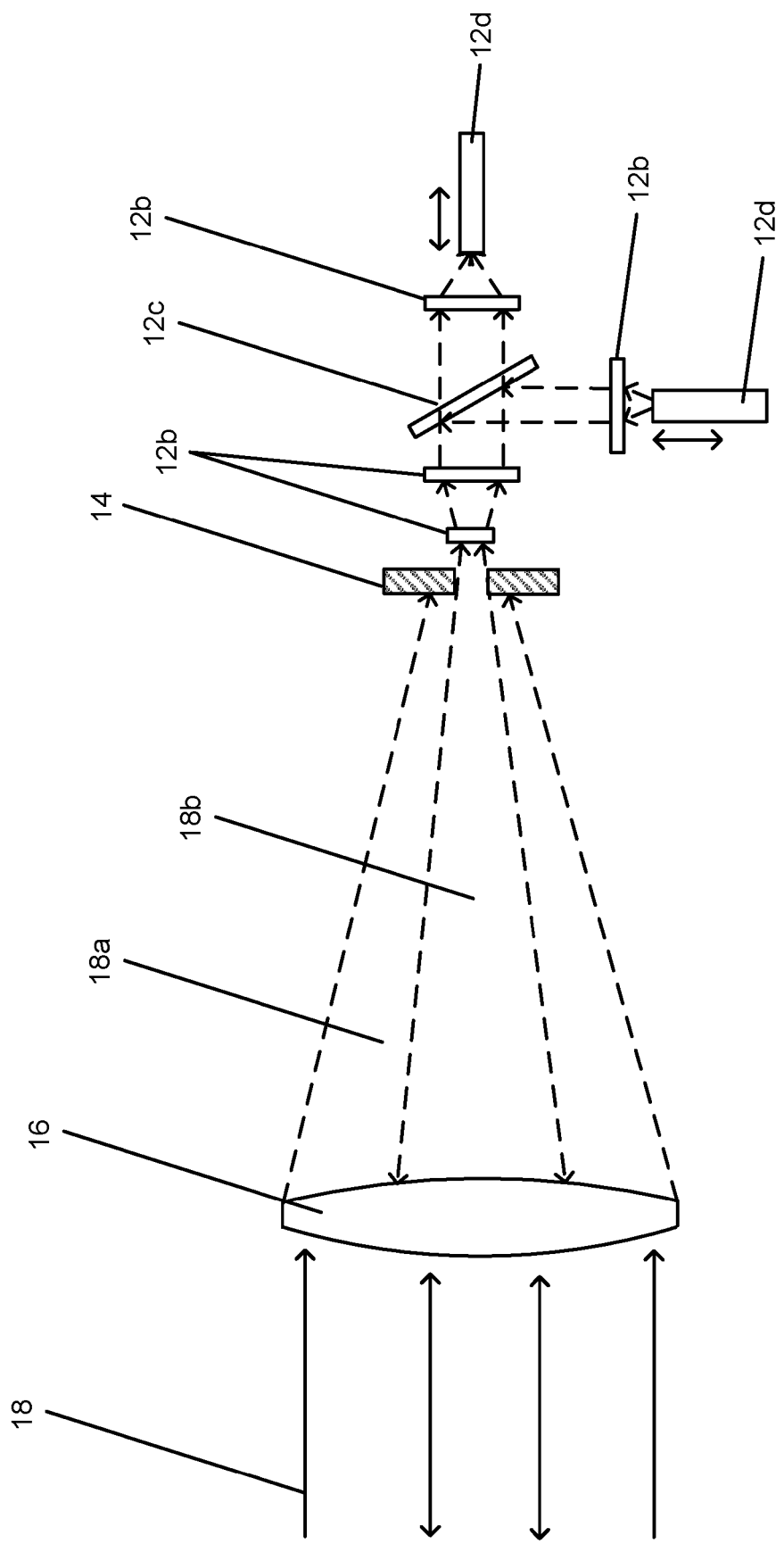
FIGS. 7A-7B illustrate exemplary system component configurations according to embodiments described herein.

FIG. 7A illustrates a component representation of the block diagram of FIG. 6 for illustrative purposes. As shown, the incoming beam 18 is focused through optic 16 (Tx/Rx optics 46 of FIG. 6) that may be any configuration or combination thereof described herein. A portion of the light 18a is focused on alignment sensor 14 RX alignment sensor 44 of FIG. 6), while a portion is passed through aperture of alignment sensor 14. Additional Tx/Rx optics 46 of FIG. 6 may include a series of lenses 12b and/or splitter 12c to separate and focus the transmit and receive beams on respective terminal ends of optical fibers 12d. The PAT controller 41 may be used to translate the optical fibers 12d in one, two, or three dimensions to assist in system alignment.

Exemplary embodiments of the alignment sensor comprise a sensor portion defining an outer section and an aperture through a central section. The central section may be coaxial with the center of the optic or may be off-center from the optic. The alignment sensor therefore includes a central aperture 13 circumscribed by a plurality of sensors. In an exemplary embodiment, the central aperture is surrounded by two or more and preferable three to six detectors. The detectors may circumscribe the aperture and substantially fill a perimeter around or substantially surround the aperture, where substantially can be understood by a person of skill in the art to include more than a majority and is approximately the entire perimeter but accounts for dead space between sensors and positioning tolerances required between components. The detection sensor 12 (either an outer perimeter or the working surface of the detector area) can be larger, smaller, or approximately equal to the aperture. The detection sensor 12 may be positioned in front of, flush with, or behind the alignment sensor surface 14.

As seen in FIG. 3, an exemplary alignment sensor is a quadcell having four distinct detection areas 14a-14d. As shown, a quadcell detector may be used as the plurality of detectors circumscribing the aperture. The quadcell includes a central hole positioned between the four detecting cells or quadrants. The hole is sized to permit the desired beam transmit/receive signal to align with the detection sensor or other optical components as described herein. The quadcell may be positioned such that the detection sensor axis (normal to the sensing face) is aligned with the center of the quadcell. The detection sensor may be positioned at the center of the quadcell or may be positioned behind the quadcell (or on an opposing side than the inlet/outlet aperture of the terminal). Exemplary embodiments may also reposition the detection sensor and use other optical components to direct the beam to the detection sensor, such as an optical fiber. In which case, the terminal end of the optical fiber can be positioned in place of the detection sensor as described herein.

Figure 7B:
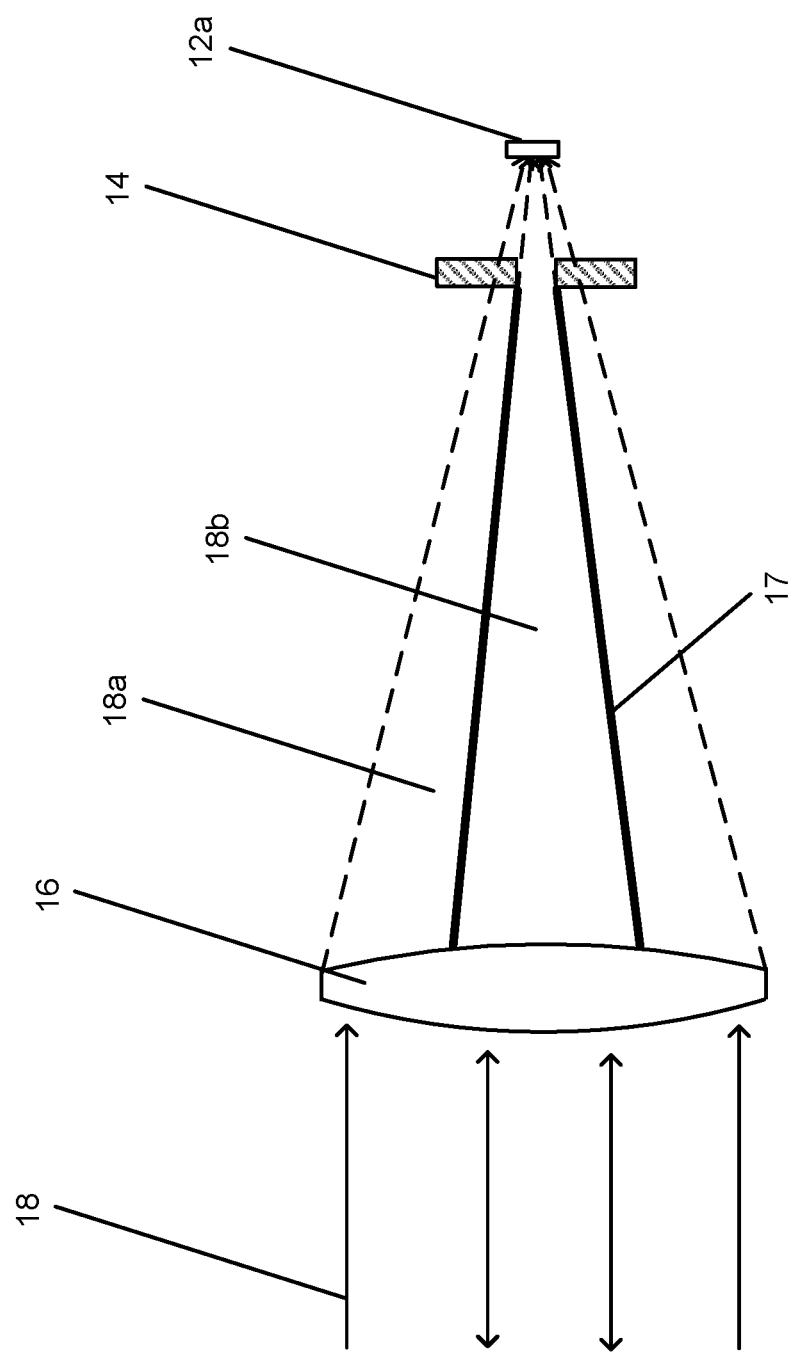

FIG. 7B illustrates an exemplary configuration similar to FIG. 3 with the inclusive of an internal baffle to isolate transmitted light from the alignment sensor for an FSO node having a common transmit/receive aperture. Especially if the transmit and receive beams use the same or similar wavelengths, then the alignment sensor may detect backscatter from the transmitted wave and cause the system to realign based on auxiliary backscatter light instead of that received from the opposing FSO node. Accordingly, an internal baffle cone could serve to provide isolation between the transmit and receive beams if a similar wavelength is used. As shown, a baffle 17 in incorporated in the optical path to separate the received light 18 into two portions: the detected portion 18b and the alignment portion 18a. The detected light 18b is focused onto a terminal end of an optical fiber 12a configured to receive light and direct the light to a detection sensor, and transmit light originating from a light source. The alignment light portion is focused or directed onto the alignment sensor 14. When the transmitted beam is propagated from the optical fiber 12a, the light is separated or isolated by the baffle 17 and does prevented from entering the alignment portion 18a.

For a bi-directional link between two FSO nodes, exemplary embodiments may be used such that the incoming data beam can also be used for tracking. In an exemplary embodiment, an exemplary free space optical node may include any combination of:

a common objective lens for transmit (Tx) and receive (Rx);
an annular area around the Tx is captured by the quadcell with a hole for guiding;
for a uni-directional link, the quadcell can be chosen to match the wavelength of the guide beacon, or use nearly the same wavelength as the Tx.
for a bidirectional link, the Tx and Rx can be separated with a beam splitter or optical circulator;
for use with a Tx/Rx fiber, the quadcell and Tx/Rx fiber could be integrated into a structure that eliminates the need for beamsplitters, simplifying the mechanical design; and/or
an internal baffle cone could serve to provide isolation between Tx and Rx if a similar wavelength is used.

The above features are exemplary only, and may be used in any combination or sub-combination as is desired for the application. Other features may be added or the above features may also be modified to achieve the objective of a user. For example, ranges, such as for wavelengths, may be redefined for particular applications, distances, environments, etc. Also, features may be removed and others redefined to accommodate the removal of a feature, such as the added or removed baffle cone of exemplary FIG. 7B above.

Exemplary embodiments may be used to align and use (send/receive signals) the terminal while reducing system complexity. Exemplary embodiments use an increased lens size and use the light with a higher numerical aperture (NA) on a wave front sensor (WFS), such as a quadcell with a hole. An annular ring from this section of the objective will be seen on the quadcell. The inside annulus comes from the hole in the quad while the outside comes from the edges of the objective. Any angular change moves this outside edge shifting the balance of light on the quadrants.

Part of the tuning parameters of the system include the position of the optics, such as the sensors and/or optical fibers (see, e.g. FIG. 7A). For example, a position of the alignment wave front sensor inside a focal plane of the corresponding light on the detection sensor changes the hole size, and also allows changing the field of view (FOV) and linear region over which it works. In practice, linearity only really matters when the beam is centered and the link is in operation. During acquisition with large angle errors, knowing the sign is enough to steer towards the center.

In an exemplary embodiment, the detection sensor and alignment sensor may be along an optical path, but used with different optical beams. Specifically, if the two sensors detect different wavelengths and transparent to the wavelength of the other sensor, then the backscatter or other interference between the sensors is reduced or eliminated. However, two light sources are necessary at the sending node to be received. For example, if an FSO system is using 1550 nm wavelength light for transmitting data (the detection sensor), a silicon quadcell could be used as an alignment sensor as it is transparent at the data wavelength. In this embodiment, a guide beacon would be chosen for Silicon and the data transmitted on 1550 nm. Therefore, an extremely high isolation can be achieved without the baffle cone.

Figure 8B:
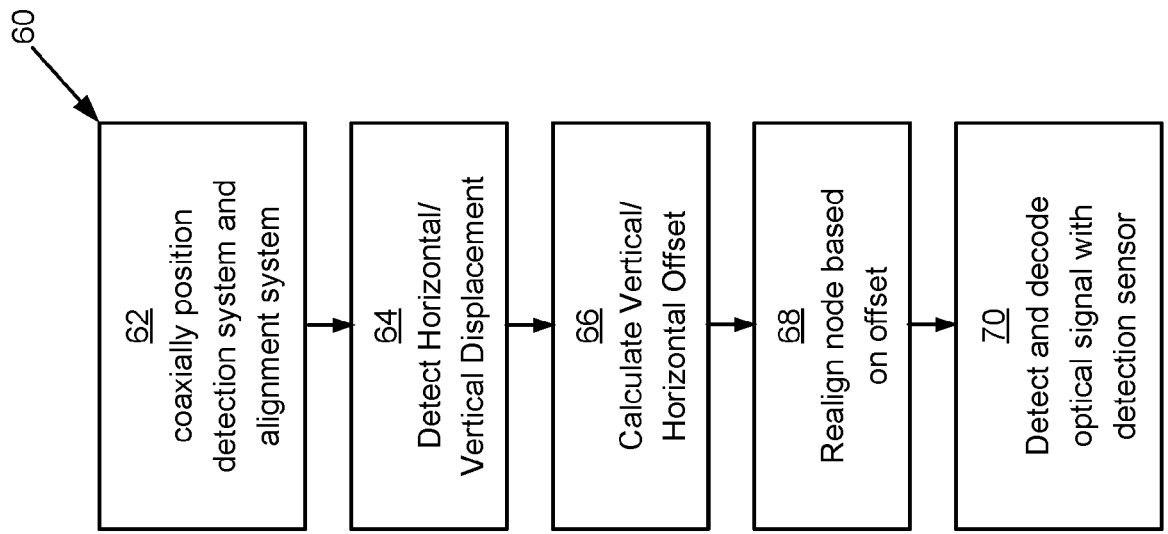
FIG. 8B illustrates an exemplary method of aligning a system according to embodiments described herein.
Figure 8A:
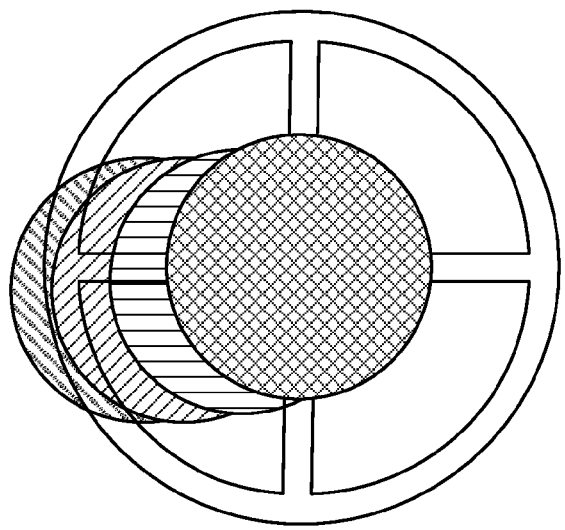
FIG. 8A illustrates an exemplary light alignment path on an exemplary alignment sensor according to embodiments described herein.
Figure 9:
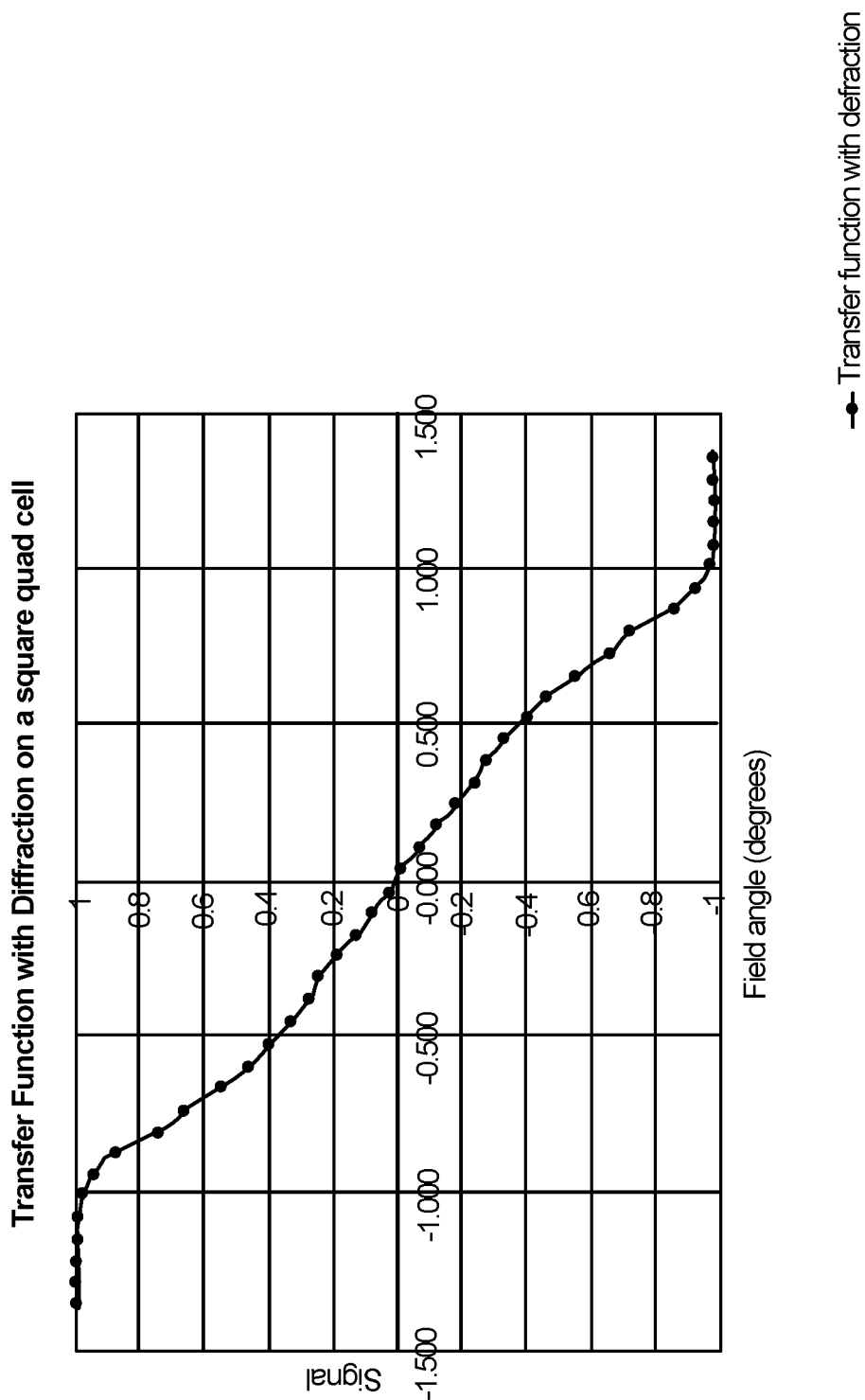
FIG. 9 illustrates a representative transfer function during an alignment.

FIG. 8A illustrates an exemplary light alignment on an exemplary quadcell as the beam is positioned. The receive beam is seen on the quadcell. The upper quadrants detect more light and therefore, the terminal can be moved upwards, or the transmitting beam (other terminal) moved downwards. The beam can be aligned such that it is centered on the quadcell and therefor on the centered optical fiber within the aperture of the quadcell. A representative transfer function is illustrated in FIG. 9. This one is notional for a particular application, but shows the basic behavior.

Exemplary embodiments described herein include using a free space optical terminal in which a portion of the received beam is used for aligning the system and a separate portion of the beam is used for receiving, transmitting, and any combination thereof for a data signal. The exemplary method can be used without a beam splitter that separates the beam into separate paths. In an exemplary embodiment, the first portion of the beam used for alignment is an exterior portion circumscribing the second portion used for transmitting and/or receiving the data signal. Therefore, the first portion may be a central portion, while the second portion may be a circumferential exterior portion of the same beam. Exemplary embodiments may also capture the entire beam for communication by positioning the detection sensor before the alignment sensor and focusing the light on the detection sensor. In exemplary embodiments, a controller is coupled to one or more optical components to adjust or control the position of the components and are able to position, aligned, or alter the working components of the system.

The method may include receiving an optical beam at the FSO terminal. The method includes positioning the beam such that a first portion falls on one or more detector(s) for aligning the terminal with the received beam (or any first system function), and a second portion falls on one or more receiver(s), such as a fiber optic or detection sensor, for detecting and/or directing the signal for analyzing a data signal carried on the received light. The system is configured such that the detector(s) circumferentially surround the receiver(s).

As shown and described, a quadcell is used to illustrate the plurality of detectors around the optical fiber or detection sensor. However, it should be understood that any combination of detectors may be positioned around the common receive/transmit path. The detectors may be of the same kind, or may be different. There are variants for the tilt sensor choice and a quadcell is not exclusive. Anything from normal quads to custom multi pixel detectors including focal plane arrays with random sub array read out may be used. Exemplary embodiments permit the light to pass through a hole, aperture, or space between detectors, or have a material that transmits the light used for data transmission.

As shown and described, the receiver for receiving and transmitting the light for data transmission is shown and described interior the detectors for alignment or other system function, such that the detectors circumferentially surround the receiver. However, these functions and/or components may be switched and is not limited to the exemplary embodiment described.

"Substantially fill" or "substantial" is intended to mean greater than a majority, such as more than 75%. A majority is intended to mean 50%. Numerical ranges are also used herein and are approximations only. Approximations are understood to be within the person of skill in the art. For example, when a series of detectors approximately fully surround or circumscribe an optical fiber, it is understood that natural dead space or gaps must accompany the areas between the detectors. These approximations are within the skill of the art to determine and may depend on system components, tolerances, wavelengths, system size, etc. Therefore, approximately fully surround is understood to have detectors positioned around the detectors to minimize the dead space, but would be dependent upon the kind and quantity of detectors selected. An optical beam path is understood to be the linear longitudinal direction of a propagated beam.

Exemplary embodiments may be incorporated into a free space optical terminal used for both transmitting and receiving data signals. In an exemplary embodiment, the FSO terminal may use common optics for transmitting and receiving a data signal therefrom/thereto. For example, U.S. application Ser. No. 14/608,166, titled "Data Retransmission for Atmospheric Free Space Optical Communication System," owned by the present applicant, and incorporated by reference in its entirety herein, discloses an FSO unit that may use a common aperture and optics for transmitting and receiving a data signal. Exemplary embodiments described herein may be used in conjunction with or replace the components for alignment and detecting. For example, the components labeled 20, 22, and 24 of FIG. 2 of the Data Retransmission application may be replaced by embodiments described herein. Other exemplary systems that may inform alternative configurations of the instant invention include, but are not limited to those disclosed by U.S. application Ser. No. 14/608,133, filed Jan. 28, 2015, titled "Free Space Optical Communication Tracking with Electronic Boresight Compensation . . . ", U.S. Provisional Application No. 62/238,637, filed Oct. 7, 2015, titled "Fast Tracking Free Space Optical Module," and U.S. Provisional Application 62/266,710, filed Dec. 14, 2015, titled "Free Space Optical System with Common Transmit and Receive Paths," both filed concurrently herewith, and incorporated in their entirety herein.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

The invention claimed is:

1. A free space optical node configured to receive a received optical beam from and transmit a transmitted optical beam to a remote free space optical node, comprising:
  a fore optic positioned to receive at least a portion of the received optical beam, the fore optic directing a first portion of the received optical beam at a first plane and a second portion of the optical beam at a second plane, wherein an optical path of at least a portion of light passing through the fore optic intersects the first plane and the second plane;
  an alignment sensor having a detecting surface positioned at the first plane that receives the first portion of the received optical beam, a portion of the alignment sensor defining a cavity;
  a receiver, coupled to receiving electronics, positioned at the second plane and with respect to the cavity such that the receiver receives the second portion of the received optical beam; and
  a Pointing, Acquisition, and Tracking (PAT) control system coupled to the alignment sensor, the PAT control system configured to control a physical position of the fore optic based, at least in part, on the first portion of the received optical beam received by the detecting surface.

2. The free space optical node of claim 1, wherein the first plane and the second plane are a same plane, and the receiver is positioned within the cavity defined by the alignment sensor.

3. The free space optical node of claim 2, wherein the cavity is defined in a center of the alignment sensor.

4. The free space optical node of claim 1, wherein the first plane and the second plane are parallel and the first plane is between the fore optic and the second plane.

5. The free space optical node of claim 4, wherein the second portion of the received optical beam passes through the cavity defined by the alignment sensor as it travels towards the receiver at the second plane.

6. The free space optical node of claim 1, wherein the receiver does not receive any of the first portion of the received optical beam directed by the fore optic.

7. The free space optical node of claim 1, wherein the first plane and the second plane are parallel and the second plane is between the fore optic and the first plane.

8. The free space optical node of claim 7, wherein the receiver is aligned with the cavity defined by the alignment sensor, such that the second portion of the received optical beam travels towards the receiver.

9. The free space optical node of claim 1, wherein the alignment sensor is a quad-cell and the cavity is defined in a center of the quad-cell.

10. The free space optical node of claim 1, wherein the alignment sensor is used to align the free space optical node and includes a plurality of sensors that detect a displacement of the received optical beam from a center of the alignment sensor.

11. The free space optical node of claim 1, wherein the free space optical node is a co-boresighted node such that transmit and receive optical paths are shared for at least a portion of an optical path traveled within the free space optical node.

12. The free space optical node of claim 1, wherein the receiver comprises an optical fiber.

13. The free space optical node of claim 12, wherein the optical fiber is coupled to receiving and transmitting electronics at a terminal end of the optical fiber, and the optical fiber includes an initial end positioned at the second plane, the optical fiber passing the transmitted and the received optical beams between the initial end and the terminal end of the optical fiber.

14. The free space optical node of claim 12, wherein the optical fiber is a bi-directional fiber.

15. The free space optical node of claim 1, wherein the first portion of the received optical beam comprises a first wavelength that will be received at the first plane for aligning the alignment sensor and the second portion of the received optical beam that will be received at the second plane comprises a second wavelength for data communication.

16. The free space optical node of claim 15, wherein the alignment sensor detects the first wavelength and is transparent to the second wavelength.

17. The free space optical node of claim 15, wherein the receiver detects the second wavelength and is transparent to the first wavelength.

18. The free space optical node of claim 1, wherein the fore optic includes a baffle to isolate transmitted light from the alignment sensor.

19. The free space optical node of claim 1, wherein the alignment sensor has a plurality of sensors on the detecting surface and wherein the first portion of the received optical beam received by the alignment sensor illuminates each of the plurality of sensors.

\* \* \* \* \*